United States Patent
Yang et al.

(10) Patent No.: US 10,243,629 B2
(45) Date of Patent: Mar. 26, 2019

(54) BASE STATION AND BEAM FORMING

(71) Applicant: HUAWEI TECHNOLOGIES CO., LTD., Shenzhen (CN)

(72) Inventors: Jing Yang, Shanghai (CN); Jinlin Zhang, Shanghai (CN)

(73) Assignee: Huawei Technologies Co., Ltd. (CN)

( * ) Notice: Subject to any disclaimer, the term of this patent is extended or adjusted under 35 U.S.C. 154(b) by 155 days.

(21) Appl. No.: 15/260,657

(22) Filed: Sep. 9, 2016

(65) Prior Publication Data

US 2016/0380680 A1 Dec. 29, 2016

Related U.S. Application Data

(63) Continuation of application No. PCT/CN2015/070849, filed on Jan. 16, 2015.

(30) Foreign Application Priority Data

Mar. 10, 2014 (CN) .......................... 2014 1 0085576

(51) Int. Cl.
*H04B 7/0426* (2017.01)
*H04B 7/0413* (2017.01)
(Continued)

(52) U.S. Cl.
CPC ........... *H04B 7/043* (2013.01); *H04B 7/0413* (2013.01); *H04B 7/0456* (2013.01);
(Continued)

(58) Field of Classification Search
CPC .................................................... H04B 7/043
See application file for complete search history.

(56) References Cited

U.S. PATENT DOCUMENTS 8,792,933 B2 * 7/2014 Chen ...................... H04B 7/022
                                                          370/254
2005/0101352 A1 * 5/2005 Logothetis ............. H01Q 1/246
                                                          455/562.1
(Continued)

FOREIGN PATENT DOCUMENTS

CN          101064942 A      10/2007
CN          101192868 A       6/2008
(Continued)

OTHER PUBLICATIONS

Chinese Office Action in Chinese Application No. 201410085576.2, dated Feb. 28, 2018, 13 pages.
(Continued)

*Primary Examiner* — Raj Jain
*Assistant Examiner* — Andrew C Lee
(74) *Attorney, Agent, or Firm* — Fish & Richardson P.C.

(57) ABSTRACT

Embodiments of the present disclosure provide a base station and a beam forming method. The method includes: determining, according to uplink sounding signals separately received using m beams, an uplink receive power of each beam in the m beams, where m is a positive integer greater than 2; selecting n beams from the m beams according to the uplink receive power of each beam in the m beams, where 2≤n<m, and n is a positive integer; determining a beamforming BF weighted value according to uplink sounding signals separately received using the n beams; and weighting the n beams using the beamforming (BF) weighted value, so as to form optimized beams used for data transmission. According to some embodiments of the present invention, a BF technology can be effectively implemented in a multiple-input multiple-output (MIMO) system.

18 Claims, 1 Drawing Sheet

(51) Int. Cl.
  *H04B 7/06* (2006.01)
  *H04B 7/08* (2006.01)
  *H04L 5/00* (2006.01)
  *H04B 17/318* (2015.01)
  *H04B 7/0456* (2017.01)
  *H04W 72/04* (2009.01)
  *H04W 52/42* (2009.01)
  *H04L 5/14* (2006.01)

(52) U.S. Cl.
  CPC ......... *H04B 7/0617* (2013.01); *H04B 7/0639* (2013.01); *H04B 7/0695* (2013.01); *H04B 7/088* (2013.01); *H04B 17/318* (2015.01); *H04L 5/0048* (2013.01); *H04L 5/0094* (2013.01); *H04W 52/42* (2013.01); *H04W 72/0413* (2013.01); *H04L 5/14* (2013.01)

(56) References Cited

U.S. PATENT DOCUMENTS

| | | | |
|---|---|---|---|
| 2007/0104283 A1* | 5/2007 | Han | H04B 7/0408 375/260 |
| 2009/0189812 A1* | 7/2009 | Xia | H04B 7/0617 342/374 |
| 2009/0196203 A1* | 8/2009 | Taira | H04B 7/0617 370/280 |
| 2009/0207077 A1* | 8/2009 | Hwang | H01Q 3/40 342/374 |
| 2009/0227249 A1* | 9/2009 | Ylitalo | H04B 7/0408 455/424 |
| 2010/0142462 A1* | 6/2010 | Wang | H04B 7/024 370/329 |
| 2010/0273498 A1* | 10/2010 | Kim | H04W 24/02 455/450 |
| 2011/0069633 A1* | 3/2011 | Schmidt | H01Q 1/246 370/254 |
| 2011/0286372 A1* | 11/2011 | Taghavi Nasrabadi | H04B 7/0851 370/310 |
| 2013/0163457 A1* | 6/2013 | Kim | H04W 24/02 370/252 |
| 2013/0215989 A1* | 8/2013 | Miyatani | H04B 7/0617 375/267 |
| 2014/0073337 A1* | 3/2014 | Hong | H04W 16/28 455/452.1 |
| 2014/0177683 A1* | 6/2014 | Krishnamurthy | H04B 7/0469 375/219 |
| 2014/0177745 A1* | 6/2014 | Krishnamurthy | H04B 7/0413 375/267 |
| 2014/0192917 A1* | 7/2014 | Nam | H04B 7/0417 375/267 |
| 2014/0241242 A1* | 8/2014 | Josiam | H04W 88/02 370/328 |
| 2014/0334564 A1* | 11/2014 | Singh | H04B 7/0413 375/267 |
| 2015/0049824 A1* | 2/2015 | Kim | H04B 7/0456 375/267 |
| 2015/0139292 A1* | 5/2015 | Shirani-Mehr | H04L 5/0085 375/227 |
| 2016/0241323 A1* | 8/2016 | Ko | H04B 7/0691 |

FOREIGN PATENT DOCUMENTS

| | | |
|---|---|---|
| CN | 101485107 A | 7/2009 |
| CN | 102045856 A | 5/2011 |
| CN | 102325328 A | 1/2012 |
| CN | 102832982 A | 12/2012 |
| EP | 2056505 A1 | 5/2009 |
| EP | 3046269 A1 | 7/2016 |

OTHER PUBLICATIONS

Chinese Search Report in Chinese Application No. 201410085576.2, dated Feb. 20, 2018, 4 pages.
International Search Report issued in International Application No. PCT/CN2015/070849 dated Apr. 16, 2015, 4 pages.
Office Action issued in Chinese Application No. 201410085576.2 dated Jul. 31, 2017; 16 pages.
Extended European Search Report issued in European Application No. 15760785.4, dated Jan. 3, 2017, 7 pages.
International Search Report issued in International Application No. PCT/CN2015/070849, 4 pages.

* cited by examiner

BASE STATION AND BEAM FORMING

CROSS-REFERENCE TO RELATED APPLICATIONS

This application is a continuation of International Application No. PCT/CN 2015/070849, filed on Jan. 16, 2015, which claims priority to Chinese Patent Application No. 201410085576.2, filed on Mar. 10, 2014, both of which are hereby incorporated by reference in their entireties.

TECHNICAL FIELD

The present disclosure relates to the field of communications, and in particular, to a base station and a beam forming method.

BACKGROUND

In a multiple-input multiple-output (MIMO) technology, not only a spatial multiplexing gain provided by a MIMO channel can be used to increase a channel capacity, but also a spatial diversity gain provided by the MIMO channel can be used to improve channel reliability and decrease a bit error rate. Therefore, a MIMO system gradually becomes a research focus in the field of communications.

In a time division duplex (TDD) system, by using a beamforming (BF) technology, reciprocity between an uplink channel and a downlink channel can be used to weight a transmitted beam, so as to generate a directional beam and target the beam at target user equipment (UE).

SUMMARY

Embodiments of the present disclosure provide a base station and a beam forming method, so as to effectively implement a BF technology in a MIMO system in some instances.

According to a first aspect, a base station is provided. The base station includes one or more processors and a non-transitory computer-readable storage medium coupled to the processor and storing programming instructions for execution by the processor. The programming instructions instruct the one or more processors to determine, according to uplink sounding signals separately received using m beams, an uplink receive power of each beam in the m beams, wherein m is a positive integer greater than 2; select n beams from the m beams according to the uplink receive power of each beam in the m beams, wherein $2 \leq n < m$, and n is a positive integer; determine a beamforming (BF) weighted value according to uplink sounding signals separately received using the n beams; and weight the n beams using the BF weighted value for forming beams used for data transmission.

With reference to the first aspect, in a first possible implementation manner, the programming instructions further instruct the one or more processors to sort the m beams in a descending order of uplink receive powers of the m beams; and select first n beams from the sorted m beams as the n beams.

With reference to the first aspect, in a second possible implementation manner, a ratio of an uplink receive power of each beam, except a first beam, in the n beams to an uplink receive power of the first beam is less than a preset threshold, wherein the first beam is a beam with a largest uplink receive power among the n beams.

With reference to the first aspect, in a third possible implementation manner, the programming instructions further instruct the one or more processors to determine, according to the uplink sounding signals separately received by the base station using the n beams, a channel covariance matrix corresponding to the n beams; and perform eigenvalue decomposition on the channel covariance matrix to determine the BF weighted value.

With reference to the first aspect, in a fourth possible implementation manner, wherein the m beams are formed by antenna weighting.

With reference to the first aspect, in a fifth possible implementation manner, the programming instructions further instruct a determining unit to select n beams from the m beams.

With reference to the first aspect, in a sixth possible implementation manner, the programming instructions further instruct a selecting unit to determine a BF weighted value.

With reference to the first aspect, in a seventh possible implementation manner, weighting the n beams is for forming optimized beams used for data transmission.

According to a second aspect, a beam forming method is provided. The method includes determining, by a base station, according to uplink sounding signals separately received using m beams, an uplink receive power of each beam in the m beams, wherein m is a positive integer greater than 2; selecting, by the base station, n beams from the m beams according to the uplink receive power of each beam in the m beams, wherein $2 \leq n < m$, and n is a positive integer; determining, by the base station, a beamforming (BF) weighted value according to uplink sounding signals separately received using the n beams; and weighting, by the base station, the n beams using the BF weighted value, for forming beams used for data transmission.

With reference to the second aspect, in a first possible implementation manner, the selecting n beams from the m beams according to the uplink receive power of each beam in the m beams includes sorting, by the base station, the m beams in a descending order of uplink receive powers of the m beams; and selecting, by the base station, first n beams from the sorted m beams as the n beams.

With reference to the second aspect, in a second possible implementation manner, a ratio of an uplink receive power of each beam, except a first beam, in the n beams to an uplink receive power of the first beam is less than a preset threshold, wherein the first beam is a beam with a largest uplink receive power among the n beams.

With reference to the second aspect, in a third possible implementation manner, the determining, by the base station, a BF weighted value according to uplink sounding signals separately received using the n beams includes determining, by the base station, according to the uplink sounding signals separately received using the n beams, a channel covariance matrix corresponding to the n beams; and performing, by the base station, eigenvalue decomposition on the channel covariance matrix to determine the BF weighted value.

With reference to the second aspect, in a fourth possible implementation manner, the m beams are formed by antenna weighting.

With reference to the second aspect, in a fifth possible implementation manner, the method further includes forming the beams used for data transmission based on weighting the n beams using the BF weighted value.

With reference to the second aspect, in a sixth possible implementation manner, weighting the n beams is for forming optimized beams used for data transmission.

According to a third aspect, a non-transitory computer readable medium is provided. The non-transitory computer readable medium stores instructions to cause a processor to perform operations including determining, by a base station, according to uplink sounding signals separately received using m beams, an uplink receive power of each beam in the m beams, wherein m is a positive integer greater than 2; selecting, by the base station, n beams from the m beams according to the uplink receive power of each beam in the m beams, wherein 2≤n<m, and n is a positive integer; determining, by the base station, a beamforming (BF) weighted value according to uplink sounding signals separately received using the n beams; and weighting, by the base station, the n beams by using the BF weighted value, for forming beams used for data transmission.

With reference to the third aspect, in a first possible implementation manner, the selecting n beams from the m beams according to the uplink receive power of each beam in the m beams includes sorting, by the base station, the m beams in a descending order of uplink receive powers of the m beams; and selecting, by the base station, first n beams from the sorted m beams as the n beams.

With reference to the third aspect, in a second possible implementation manner, a ratio of an uplink receive power of each beam, except a first beam, in the n beams to an uplink receive power of the first beam is less than a preset threshold, wherein the first beam is a beam with a largest uplink receive power among the n beams.

With reference to the third aspect, in a third possible implementation manner, the determining, by the base station, a BF weighted value according to uplink sounding signals separately received by using the n beams of the base station includes determining, by the base station, according to the uplink sounding signals separately received by using the n beams of the base station, a channel covariance matrix corresponding to the n beams; and performing, by the base station, eigenvalue decomposition on the channel covariance matrix to determine the BF weighted value.

With reference to the third aspect, in a fourth possible implementation manner, the m beams are formed by means of antenna weighting.

In some embodiments of the present disclosure, some beams, for example, the n beams, are selected from m beams according to an uplink receive power of each beam in the m beams; then a BF weighted value is determined according to uplink sounding signals received using the n beams; and the n beams are weighted using the determined BF weighted value, so as to obtain optimized beams used for data transmission, so that a BF technology can be effectively implemented in a MIMO system, thereby improving system performance.

BRIEF DESCRIPTION OF DRAWINGS

To describe the technical solutions in some embodiments of the present disclosure more clearly, the following briefly describes the accompanying drawings used to describe the embodiments of the present disclosure. The accompanying drawings in the following description show some embodiments of the present disclosure, and a person of ordinary skill in the art may still derive other drawings from these accompanying drawings without creative efforts.

DETAILED DESCRIPTION OF EMBODIMENTS

The following describes the technical solutions in some embodiments of the present disclosure with reference to the accompanying drawings in some embodiments of the present disclosure. The described embodiments are some rather than all of some embodiments of the present disclosure. All other implementations obtained by a person of ordinary skill in the art based on some embodiments of the present disclosure without creative efforts shall fall within the protection scope of the present disclosure.

The technical solutions of the present disclosure may be applied to various communications systems, such as: a Global System for Mobile Communications (GSM), a Code Division Multiple Access (CDMA) system, a Wideband Code Division Multiple Access (WCDMA), a general packet radio service (GPRS), Long Term Evolution (LTE), and a Universal Mobile Telecommunication System (UMTS).

User equipment (UE), also referred to as a mobile terminal (MT), mobile user equipment, or the like, may communicate with one or more core networks through a radio access network (for example, RAN). The user equipment may be a mobile terminal, such as a mobile phone (also referred to as a "cellular" phone) or a computer with a mobile terminal. For example, the user equipment may be a portable, pocket-sized, handheld, computer built-in, or in-vehicle mobile apparatus, which exchanges voice and/or data with the radio access network.

A base station may be a base transceiver station (BTS) in the GSM or CDMA, or may be a NodeB (NodeB) in the WCDMA, or may be an evolved NodeB (e-NodeB) in the LTE or other types of base stations, which is not limited in the present disclosure.

Figure 1:
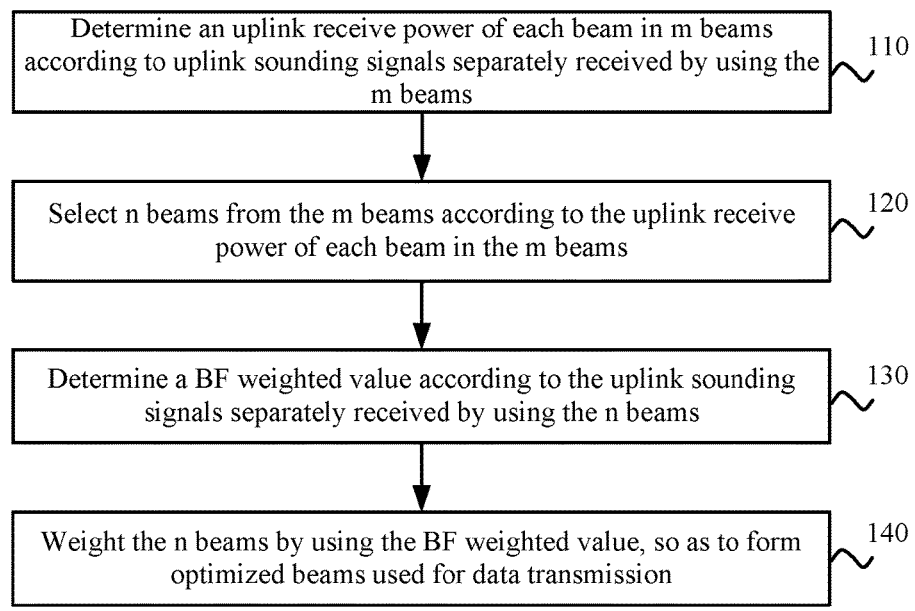
FIG. 1 is a schematic flowchart of an example beam forming method according to an embodiment of the present disclosure.

FIG. 1 is a schematic flowchart of an example beam forming method according to some embodiments of the present disclosure. The method in FIG. 1 is executed by a base station in some embodiments.

At step 110, according to uplink sounding signals separately received by the base station using m beams, an uplink receive power of each beam in the m beams is determined, where m is a positive integer greater than 2. The uplink sounding signal can include a reference signal that is transmitted from a UE to a base station.

At step 120, n beams are selected from the m beams according to the uplink receive power of each beam in the m beams, where 2≤n<m, and n is a positive integer.

At step 130, a BF weighted value is determined according to uplink sounding signals separately received by the base station using the n beams.

At step 140, the n beams is weighted using the BF weighted value, so as to form optimized beams or other beams used for data transmission.

In this embodiment, the n beams are selected from m beams according to an uplink receive power of each beam in the m beams. A BF weighted value is then determined according to uplink sounding signals received by using the n beams. The n beams are weighted using the determined BF weighted value, so as to obtain optimized beams used for data transmission. In these instances, a BF technology can be effectively implemented in a MIMO system, for improving performance of the MIMO system.

The base station may also determine, based on uplink signals of the m beams, a BF weighted value corresponding to the m beams, and weight the m beams by using the BF weighted value, so as to obtain beams used for data transmission. However, a larger quantity of beams leads to higher complexity of determining the BF weighted value based on the uplink signals of the m beams. In this example embodiment of the present disclosure, the BF weighted value may not be determined based on the m beams to weight the m beams. Instead, some beams are selected from the m beams to perform BF weighting, thereby decreasing complexity of the BF technology.

Therefore, this embodiment of the present disclosure is applicable to a large-scale antenna system. The large-scale antenna system generally refers to an antenna system that has more than eight ports and in which there may be up to hundreds of antennas.

Each beam may be corresponding to one or more ports. For example, if an antenna is a single polarized antenna, each beam may be corresponding to one port, and then the m beams may be corresponding to m ports. If an antenna is a cross polarized antenna, each beam may be corresponding to two ports. In some implementations, the large-scale antenna system may be an antenna system that has more than eight ports, and in this case, the m beams may be corresponding to more than eight ports.

A quantity of beams is related to a cell coverage area and a quantity of antenna array elements. Generally, if a beam is formed by using more antenna array elements, the beam is narrower, and a larger quantity of beams may be needed, so as to ensure a cell coverage area. In a large-scale antenna system, there may be up to hundreds of antennas, and there may also be a large quantity of beams.

In some instances, the BF technology may be difficult to implement in the large-scale antenna system because of hefty computational complexity if the base station determines, based on the uplink signals of the m beams, the BF weighted value corresponding to the m beams, and weights the m beams using the BF weighted value, so as to obtain the beams used for data transmission.

In this embodiment, the n beams are selected from m beams according to an uplink receive power of each beam in the m beams. A BF weighted value is then determined according to uplink sounding signals received by the base station using the n beams. The n beams are weighted by using the determined BF weighted value, so as to obtain optimized beams used for data transmission. The BF weighted value does not need to be determined based on the m beams to weight the m beams to obtain the beams used for data transmission. As such, a BF technology can be effectively implemented in a large-scale antenna system, thereby improving performance of the large-scale antenna system.

In some instances, the example embodiment of the present disclosure is more applicable to a time division duplex (TDD) mode of the large-scale antenna system.

Optionally, in some embodiments, the m beams may be formed by antenna weighting. For example, before step 110, the base station may form the foregoing m beams by antenna weighting.

For example, the base station may form the m beams by antenna weighting in an active antenna system (AAS). Typically, directions of the m beams are different from each other. For example, in the AAS, the base station may form beams of different directions by using different weighted values to weight multiple array elements. Therefore, at 110, the base station may obtain m beams of different directions by using different weighted values to weight multiple antenna array elements. For example, for 16 array elements, the base station may form 16 beams of different directions by antenna weighting.

Optionally, in some embodiments, the foregoing m beams may be obtained by setting antenna directions. For example, when antennas are mounted on the base station, the antennas may be enabled to separately point to m directions, so as to form the m beams.

Optionally, in some embodiments, the base station may separately receive, by using the m beams, uplink sounding signals sent by UE. Specifically, the base station may separately receive the uplink sounding signals from the UE by using ports corresponding to the m beams.

At step 110, the base station may obtain the uplink receive power of each beam in the m beams after a period of statistics collection. For example, a time-domain counter may be set in the base station, so as to collect statistics about the uplink receive power of each beam within a time-domain filtering window length. In some embodiments, an average uplink receive power of each beam over the time-domain filtering window length may be used as the uplink receive power of each beam.

As an example, the base station may determine the average uplink receive power of each beam according to the following steps:

(A) The base station may receive the uplink sounding signals from the UE using all ports corresponding to the m beams. The base station may perform channel estimation at each port based on an uplink sounding signal to determine a corresponding channel coefficient, on a subcarrier, of each port. For example, for a $j^{th}$ port corresponding to an $i^{th}$ beam in the m beams, a channel coefficient, obtained by estimation, on a subcarrier k may be represented by $h_{i,j,k}$.

(B) The base station may calculate an average power, on all ports and all subcarriers, of a channel coefficient of each beam.

For example, an average uplink receive power of an $i^{th}$ beam is $$|h|^2_{i,avg} = \frac{1}{N_{port} * N_{subcarr}} \sum_{k=1}^{N_{subcarr}} \sum_{j=1}^{N_{port}} |h_{i,j,k}|,$$

where $N_{port}$ may represent a total quantity of ports corresponding to the m beams, and $N_{subcarr}$ may represent a total quantity of subcarriers over which the uplink sounding signal is transmitted for the $i^{th}$ beam in the m beams.

(C) The base station may filter the average uplink receive power of each beam in a time domain, and accordingly, the time-domain counter increases a count by 1.

(D) The base station may determine whether the time-domain counter reaches the time-domain filtering window length. If the time-domain counter does not reach the time-domain filtering window length, the base station returns to the foregoing step (A).

If the time-domain counter reaches the time-domain filtering window length, the average uplink receive power of each beam in the m beams in this period of time may be used as the uplink receive power of each beam in the m beams, and then may be used for processing at step 130.

Optionally, in some embodiments, at step 120, the base station may sort the m beams in a descending order of uplink receive powers of the m beams. Then, the base station may select first n beams from the sorted m beams as the foregoing n beams.

In some embodiments, the base station selects first n beams with relatively large uplink receive powers from the m beams, which can may improve use of a spatial characteristic of UE, and in one embodiment may fully utilize a spatial characteristic of UE. In this way, optimized beams formed by weighting the n beams can, in some implementations, better meet the spatial characteristic of the UE, thereby improving performance of a MIMO system, especially performance, such as data transmission performance, of a large-scale antenna system.

In some implementations, n is greater than or equal to 2, that is, the base station may select at least two beams with relatively large uplink receive powers from the m beams for use in subsequent BF processing. If one beam with a largest uplink receive power is selected from the m beams, beams of different directions cannot be formed by weighting the one beam using a BF technology because the direction of the one beam is fixed. In this case, optimized beams used for data transmission may not be flexibly formed according to a spatial characteristic of UE, thereby affecting performance of a MIMO system, especially performance of a large-scale antenna system. Therefore, in some implementations, at least two (that is, n) beams with relatively large uplink receive powers are selected from the m beams for use in subsequent BF processing. Uplink receive powers of the n beams are relatively large, such that directions of the n beams meet or better match the spatial characteristic of the UE. After BF weighting is performed on the n beams, beams that better match the spatial characteristic of the UE can be formed for data transmission.

Optionally, in some embodiments, a ratio of an uplink receive power of each beam, except a first beam, in the n beams to an uplink receive power of the first beam may be less than a preset threshold, where the first beam is a beam with a largest uplink receive power among the n beams.

Specifically, the beam with the largest uplink receive power may be referred to as the first beam. For the selected n beams, the ratio of the uplink receive power of each beam except the first beam to the uplink receive power of the first beam may be less than the preset threshold. For example, the threshold may be preset to 10 dB. A ratio of an uplink receive power of each beam, except the n beams, in the m beams to the largest uplink receive power is greater than or equal to the threshold. In some embodiments, the base station may select a beam whose uplink receive power is close to the largest uplink receive power for use in subsequent BF weighting processing, so as to form beams that may better meet a spatial characteristic of UE.

Optionally, in some embodiments, at step 130, the base station may determine, according to the uplink sounding signals separately received by the base station using the n beams, a channel covariance matrix corresponding to the n beams. Then, the base station may perform eigenvalue decomposition on the channel covariance matrix, so as to determine the BF weighted value.

Specifically, the base station may receive the uplink sounding signals of UE by using the n beams, and then the base station may estimate an uplink sounding channel according to the uplink sounding signals received by the base station using the n beams, so as to obtain a channel covariance matrix of the uplink sounding channel. Then, the base station may perform eigenvalue decomposition on the channel covariance matrix, so as to obtain the BF weighted value.

In a traditional BF implementation solution, in a case of m beams, the base station determines, according to uplink sounding signals received by the base station using the m beams, a channel covariance matrix corresponding to the m beams, and then perform eigenvalue decomposition on the channel covariance matrix corresponding to the m beams. Because the channel covariance matrix corresponding to the m beams has a relatively large quantity of dimensions, the eigenvalue decomposition is complex, and has a large delay.

In some embodiments, the base station performs eigenvalue decomposition on a channel covariance matrix corresponding to n beams, n<m. Compared with the channel covariance matrix corresponding to the m beams, the channel covariance matrix corresponding to the n beams has a smaller quantity of dimensions. The complexity of eigenvalue decomposition is decreased when eigenvalue decomposition is performed on the channel covariance matrix corresponding to the n beams, thereby may decrease complexity of acquiring the BF weighted value. Therefore, a BF technology can be implemented in a MIMO system, and especially, the BF technology can be implemented in a large-scale antenna system.

For example, in a case that m is 16, n is 2, and each beam is corresponding to two ports, that is, the base station forms 16 beams by means of antenna weighting. After sorting the 16 beams according to an uplink receive power of each beam in the 16 beams, the base station selects first two beams from the sorted 16 beams.

When determining a BF weighted value corresponding to the 16 beams, the base station may perform eigenvalue decomposition on a 32×32 matrix. However, in this embodiment, a BF weighted value is determined for the selected two beams, and therefore, the base station may perform eigenvalue decomposition only on a 4×4 matrix. In this embodiment, complexity of eigenvalue decomposition can be decreased, so does complexity of acquiring the BF weighted value. As such, a BF technology can be effectively implemented in a large-scale antenna system.

Figure 2:
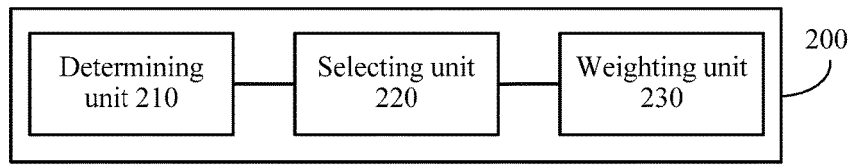
FIG. 2 is a schematic block diagram of an example base station according to an embodiment of the present disclosure.

FIG. 2 is a schematic block diagram of an example base station according to some embodiments of the present disclosure. The base station 200 in FIG. 2 includes a determining unit 210, a selecting unit 220, and a weighting unit 230.

The determining unit 210 determines, according to uplink sounding signals separately received by the base station using m beams, an uplink receive power of each beam in the m beams, where m is a positive integer greater than 2. The selecting unit 220 selects n beams from the m beams according to the uplink receive power of each beam in the m beams, where 2≤n<m, and n is a positive integer. The uplink receive power is determined by the determining unit 210. The determining unit 210 further determines a BF weighted value according to uplink sounding signals separately received by using the n beams selected by the selecting unit 220. The weighting unit 230 weights the n beams using the BF weighted value determined by the determining unit 210, so as to form optimized beams used for data transmission.

In some embodiments, the n beams are selected from m beams according to an uplink receive power of each beam in the m beams; then a BF weighted value is determined according to uplink sounding signals received by the base station using the n beams; and the n beams are weighted using the determined BF weighted value, so as to obtain optimized beams used for data transmission. Complexity of a BF technology can be decreased, so that the BF technology can be implemented in a MIMO system, for improving system performance.

Optionally, in some embodiments, the m beams may be formed by means of antenna weighting.

Optionally, in some embodiments, the selecting unit 220 may sort the m beams in a descending order of uplink receive powers of the m beams, and then may select first n beams from the sorted m beams as the n beams.

Optionally, in some embodiments, the selecting unit 220 may select the n beams such that a ratio of an uplink receive power of each beam, except a first beam, in the n beams to an uplink receive power of the first beam is less than a preset threshold, where the first beam is a beam with a largest uplink receive power among the n beams.

Optionally, in some embodiments, the determining unit 210 may determine, according to the uplink sounding signals separately received by the base station using the n beams, a channel covariance matrix corresponding to the n beams, and then may perform eigenvalue decomposition on the channel covariance matrix to determine the BF weighted value.

For other functions and operations of the base station 200 in FIG. 2, reference may be made to a process of the example method described with respect to FIG. 1, and to avoid repetition, details are not described herein.

Figure 3:
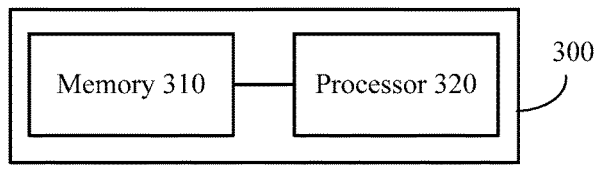
FIG. 3 is a schematic block diagram of another example base station according to another embodiment of the present disclosure.

FIG. 3 is a schematic block diagram of another example base station according to another embodiment of the present disclosure. The base station 300 in FIG. 3 includes a memory 310 and a processor 320.

The memory 310 may include a random access memory, a flash memory, a read-only memory, a programmable read-only memory, a non-volatile memory, a register, or the like. The processor 320 may be a central processing unit (CPU).

The memory 310 is configured to store an executable instruction. The processor 320 may execute the executable instruction stored in the memory 310. For example, the processor can be configured to: determine, according to uplink sounding signals separately received by the base station using m beams, an uplink receive power of each beam in the m beams, where m is a positive integer greater than 2; select n beams from the m beams according to the uplink receive power of each beam in the m beams, where 2≤n<m, and n is a positive integer; determine a BF weighted value according to uplink sounding signals separately received by the base station using the n beams; and weight the n beams using the BF weighted value, so as to form optimized beams used for data transmission.

In this embodiment, the n beams are selected from m beams according to an uplink receive power of each beam in the m beams; then a BF weighted value is determined according to uplink sounding signals received by the base station using the n beams; and the n beams are weighted using the determined BF weighted value, so as to obtain optimized beams used for data transmission. Complexity of a BF technology can be decreased, so that the BF technology can be effectively implemented in a MIMO system, thereby improving system performance.

Optionally, in some embodiments, the m beams may be formed by means of antenna weighting.

Optionally, in some embodiments, the processor 320 may sort the m beams in a descending order of uplink receive powers of the m beams, and then may select first n beams from the sorted m beams as the n beams.

Optionally, in some embodiments, a ratio of an uplink receive power of each beam, except a first beam, in the n beams to an uplink receive power of the first beam may be less than a preset threshold, where the first beam is a beam with a largest uplink receive power among the n beams.

Optionally, in some embodiments, the processor 320 may determine, according to the uplink sounding signals separately received by the base station using the n beams, a channel covariance matrix corresponding to the n beams, and then may perform eigenvalue decomposition on the channel covariance matrix to determine the BF weighted value.

For other functions and operations of the base station 300 in FIG. 3, reference may be made to a process of the example method described with respect to FIG. 1, and to avoid repetition, details are not described herein.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be understood by a person skilled in the art that, for the purpose of convenient and brief description, for a detailed working process of the foregoing system, apparatus, and unit, reference may be made to a corresponding process in the foregoing method embodiments, and details are not described herein.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the shown or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separated, and parts shown as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in some embodiments of the present disclosure. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A beam forming method, comprising:
   determining, by a base station, according to uplink sounding signals separately received using m beams, an uplink receive power of each beam in the m beams, wherein m is a positive integer greater than 2;
   selecting, by the base station, n beams from the m beams according to the uplink receive power of each beam in the m beams, wherein $2 \leq n < m$, and n is a positive integer;
   determining, by the base station, a beamforming (BF) weighted value according to uplink sounding signals separately received using the n beams; and
   weighting, by the base station, the n beams using the BF weighted value, for forming beams used for downlink data transmission.

2. The beam forming method according to claim 1, wherein the selecting n beams from the m beams according to the uplink receive power of each beam in the m beams comprises:
   sorting, by the base station, the m beams in a descending order of uplink receive powers of the m beams; and
   selecting, by the base station, first n beams from the sorted m beams as the n beams.

3. The beam forming method according to claim 2, wherein a ratio of an uplink receive power of each beam, except a first beam, in the n beams to an uplink receive power of the first beam is less than a preset threshold, wherein the first beam is a beam with a largest uplink receive power among the n beams.

4. The beam forming method according to claim 1, wherein the determining, by the base station, a BF weighted value according to uplink sounding signals separately received using the n beams comprises:
   determining, by the base station, according to the uplink sounding signals separately received using the n beams, a channel covariance matrix corresponding to the n beams; and
   performing, by the base station, eigenvalue decomposition on the channel covariance matrix to determine the BF weighted value.

5. The beam forming method according to claim 1, wherein the m beams are formed by antenna weighting.

6. The beam forming method of claim 1, further comprising forming the beams used for the downlink data transmission based on weighting the n beams using the BF weighted value.

7. The beam forming method of claim 1, wherein weighting the n beams is for forming optimized beams used for the downlink data transmission.

8. A base station, comprising:
   one or more processors; and
   a non-transitory computer-readable storage medium coupled to the one or more processors and storing programming instructions for execution by the one or more processors, the programming instructions instructing the one or more processors to:
      determine, according to uplink sounding signals separately received using m beams, an uplink receive power of each beam in the m beams, wherein m is a positive integer greater than 2;
      select n beams from the m beams according to the uplink receive power of each beam in the m beams, wherein $2 \leq n < m$, and n is a positive integer;
      determine a beamforming (BF) weighted value according to uplink sounding signals separately received using the n beams; and
      weight the n beams using the BF weighted value for forming beams used for downlink data transmission.

9. The base station according to claim 8, wherein the programming instructions further instruct the one or more processors to:
   sort the m beams in a descending order of uplink receive powers of the m beams; and
   select first n beams from the sorted m beams as the n beams.

10. The base station according to claim 9, wherein a ratio of an uplink receive power of each beam, except a first beam, in the n beams to an uplink receive power of the first beam is less than a preset threshold, wherein the first beam is a beam with a largest uplink receive power among the n beams.

11. The base station according to claim 8, wherein the programming instructions further instruct the one or more processors to:
   determine, according to the uplink sounding signals separately received by the base station using the n beams, a channel covariance matrix corresponding to the n beams; and
   perform eigenvalue decomposition on the channel covariance matrix to determine the BF weighted value.

12. The base station according to claim 8, wherein the m beams are formed by antenna weighting.

13. The base station according to claim 8, wherein weighting the n beams is for forming optimized beams used for the downlink data transmission.

14. A non-transitory computer readable medium storing instructions, which when executed by a base station, to cause the base station to perform operations comprising:
   determining, by the base station, according to uplink sounding signals separately received using m beams, an uplink receive power of each beam in the m beams, wherein m is a positive integer greater than 2;
   selecting, by the base station, n beams from the m beams according to the uplink receive power of each beam in the m beams, wherein $2 \leq n < m$, and n is a positive integer;
   determining, by the base station, a beamforming (BF) weighted value according to uplink sounding signals separately received using the n beams; and
   weighting, by the base station, the n beams by using the BF weighted value, for forming beams used for downlink data transmission.

15. The non-transitory computer readable medium according to claim 14, wherein the selecting n beams from the m beams according to the uplink receive power of each beam in the m beams comprises:
  sorting, by the base station, the m beams in a descending order of uplink receive powers of the m beams; and
  selecting, by the base station, first n beams from the sorted m beams as the n beams.

16. The non-transitory computer readable medium according to claim 15, wherein a ratio of an uplink receive power of each beam, except a first beam, in the n beams to an uplink receive power of the first beam is less than a preset threshold, wherein the first beam is a beam with a largest uplink receive power among the n beams.

17. The non-transitory computer readable medium according to claim 14, wherein the determining, by the base station, a BF weighted value according to uplink sounding signals separately received by using the n beams of the base station comprises:
  determining, by the base station, according to the uplink sounding signals separately received by using the n beams of the base station, a channel covariance matrix corresponding to the n beams; and
  performing, by the base station, eigenvalue decomposition on the channel covariance matrix to determine the BF weighted value.

18. The non-transitory computer readable medium to claim 14, wherein the m beams are formed by means of antenna weighting.

* * * * *